United States Patent [19]

Oikawa

[11] Patent Number: 5,264,846
[45] Date of Patent: Nov. 23, 1993

[54] CODING APPARATUS FOR DIGITAL SIGNAL

[76] Inventor: Yoshiaki Oikawa, c/o Sony Corporation 7-35, Kitashinagawa 6-chome, Shinagawa-ku, Tokyo, Japan

[21] Appl. No.: 859,116

[22] Filed: Mar. 27, 1992

[30] Foreign Application Priority Data

Mar. 30, 1991 [JP] Japan .................. 3-092738

[51] Int. Cl.⁵ .............................................. H03M 7/32
[52] U.S. Cl. ................................... 341/76; 381/30
[58] Field of Search ............ 341/76, 77; 381/29-40

[56] References Cited

U.S. PATENT DOCUMENTS

5,105,463  4/1992  Veldhuis et al. ................. 381/30
5,109,417  4/1992  Fielder et al. .................... 381/36
5,115,240  5/1992  Fujiwara et al. ................. 341/51
5,142,656  8/1992  Fielder et al. .................... 381/37
5,151,941  9/1992  Nishiguchi et al. .............. 381/46

Primary Examiner—Marc S. Hoff
Attorney, Agent, or Firm—Limbach & Limbach

[57] ABSTRACT

An apparatus for compressing a digital signal in which a block of a spectral components in the frequency domain is divided in frequency into at least two sub blocks. The peak value for each sub block is determined, and the difference between the peak values is determined. Block floating is applied to each sub block individually when the difference between the peak values is above a fixed value. This prevents quantizing noise from being heard when the input signal is highly tonal.

15 Claims, 11 Drawing Sheets

CODING APPARATUS FOR DIGITAL SIGNAL

BACKGROUND OF THE INVENTION

1. Field of the Invention

This invention relates to an apparatus including block floating processing for a compressing a digital signal. The invention relates more particularly to an apparatus for compressing a digital signal, in which spectral components in the frequency domain derived from the digital input signal in the time domain are divided into blocks corresponding to so. called critical bands, and block floating processing is applied to each block.

2. Prior art

Among the techniques known for compressing a digital audio signal, block floating divides digital data into blocks of a predetermined number of samples and block floating processing is applied to each block. When block floating is applied to a block, the maximum absolute value of the samples in the block is found, and the maximum absolute value is used as a common block floating coefficient or scale factor for all the samples in the block.

Also, orthogonal transform coding is known in which a signal in the time domain is transformed into spectral components in the frequency domain. The spectral components are then quantized. As examples of orthogonal transform coding, it is known to apply Fast Fourier Transform (FFT) or Discrete Cosine Transform DCT) processing to a PCM audio signal divided in the time domain into blocks of a fixed number of samples.

An apparatus for compressing a digital signal has been proposed in which the above-mentioned technologies are combined to divide spectral components in the frequency domain into blocks corresponding to predetermined frequency bands, e.g., to so-called critical bands, and to apply block floating processing to the spectral components in each block.

Figure 11:
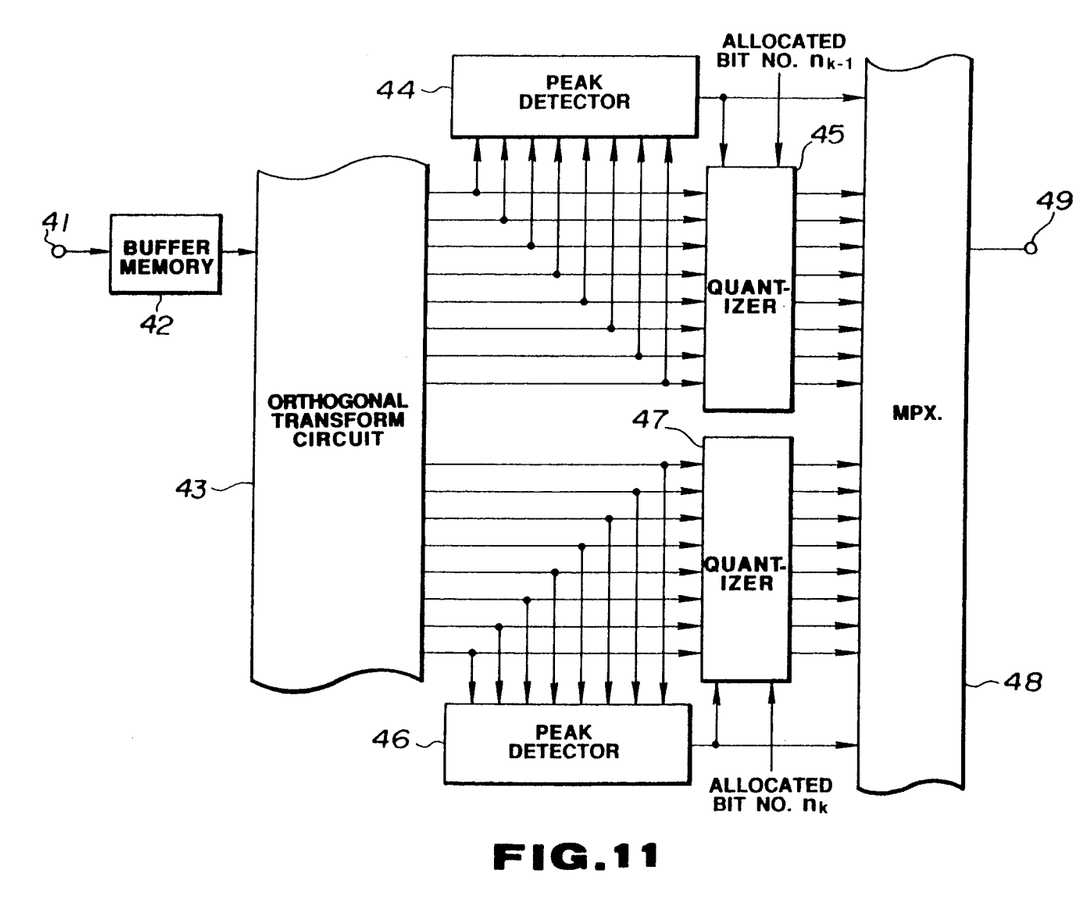
FIG. 11 is a block diagram showing the configuration of part of a conventional apparatus.

FIG. 11 shows the configuration of part of an apparatus for compressing a digital signal which incorporates both orthogonal transform processing and block floating processing.

In FIG. 11, a digital input signal such as a PCM audio signal, etc. delivered to the input terminal 41 is temporarily stored in the buffer memory 42. The signal is then orthogonally transformed, e.g., by the orthogonal transform circuit 43, which is, e.g. a FFT (Fast Fourier Transform) circuit. FIG. 11 shows the circuit section for the (k−1)-th and k-th critical bands, in both of which, the number of spectral components (FFT coefficients) is, e.g., eight. The block of eight spectral components of the (k−1)-th band is sent to the peak detector 44 and the quantizer 45. The spectral components are quantized using a scale factor corresponding to the peak value detected by the peak detector 44. The block of eight spectral components of the k-th band is also sent to the peak detector 46 and the quantizer 47. An example of the block of eight spectral components of the k-th band is shown in FIG. 12.

The quantizers 45 and 47 quantize the spectral components in each respective band using a scale factor for the band derived from the peak value provided by the respective peak detectors 44 and 46, and the allocated bit numbers $n_{k-1}$, $n_k$ for the respective bands, determined by other processing. The resulting quantized spectral components are sent to the multiplexer 48, where they are combined with the spectral components of other bands and with auxiliary information, such as the allocated bit number, etc. The multiplexed signal is fed to the output terminal 49.

Figure 12:
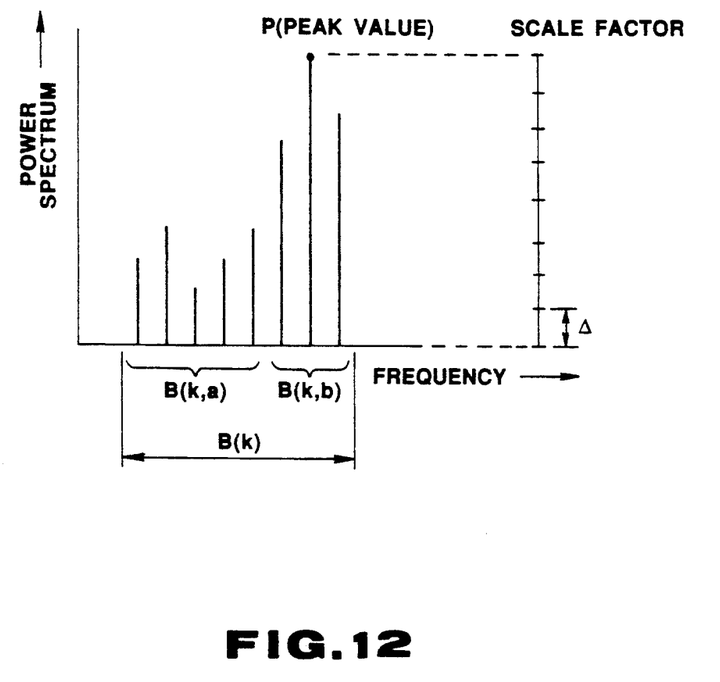
FIG. 12 is a frequency spectrum diagram for explaining operation of the conventional apparatus.

When the spectral components in a critical band differ significantly from one another, e.g., when the part of the input signal represented by the spectral coefficients in the critical band is highly tonal, as shown in FIG. 12, for example, there could be, within the block B(k), a portion B(k, b) in which the spectral components corresponding to the highly-tonal signal are dominant, and a portion B(k, a) in which no spectral component is dominant. In this case, if block floating processing is carried out using the peak value P in the block B(k) as the scale factor, the portion B(k, b) in which spectral components corresponding to the highly tonal signal are dominant is no problem, but degradation occurs with respect to the portion B(k, a) in which no spectral component is dominant.

FIG. 12 shows an example in which the allocated bit number $n_k$ is 3. It can be seen that when quantizing takes place using a quantizing step size of $\Delta$, the quantizing step size $\Delta$ is relatively large compared with the spectral components in the portion B(k, a) in which no spectral component is dominant. If quantizing is carried out using a quantizing step that is relatively large compared with the signal, the quantizing noise is large, resulting in the disadvantage that quantizing noise might be heard when the compressed signal is expanded and reproduced.

SUMMARY OF THE INVENTION

In view of the foregoing, this invention has been proposed. The invention has as its object providing an apparatus for compressing a digital signal in which spectral components in the frequency domain are divided into blocks corresponding to predetermined bands. Block floating processing is applied to each block such that, even when the input signal is highly tonal, the spectral components can be quantized in such a manner that quantizing noise is inaudible.

The invention provides an apparatus for compressing a digital signal. The apparatus includes a circuit that derives plural spectral components from the digital input signal. The spectral components in the frequency domain are divided into blocks corresponding to critical bands. The apparatus further includes a circuit that divides one of the blocks of spectral components into sub blocks, a circuit that determines a peak value for each sub block, and a circuit that determines a difference between the peak values of the sub blocks. Finally, the apparatus includes a circuit that applies block floating processing to the sub blocks individually when the difference between the peak values is above a fixed value.

The spectral components in the frequency domain are preferably obtained by orthogonally transforming a digital signal in the time domain by a Fast Fourier Transform (FFT) or Discrete Cosine Transform (DCT). Further, a critical band is preferably used as the predetermined frequency band.

When the part of the input signal represented by the spectral components in the block is highly tonal, the difference between peak values used as the scale factor for block floating processing each sub block individually is large, and exceeds the above-mentioned fixed value. Accordingly, block floating processing is applied to each sub block individually, and the part of the block in which the highly tonal signal is not dominant is quantized using a more appropriate scale factor. Thus, quantizing noise can be reduced.

The invention also provides an apparatus for compressing a digital input signal. The apparatus comprises a circuit that derives plural spectral components from the digital input signal. The plural spectral components are divided into blocks; each block corresponds to a critical band. The apparatus also includes a circuit that divides one of the blocks of spectral components into two sub blocks, and a tonality signal generating circuit that generates a tonality signal indicating when par of the input signal represented by the spectral components in the block is tonal. Finally, the apparatus includes a block floating circuit that applies applying block floating processing to both sub blocks using a common scale factor. However, the block floating circuit applies block floating to each sub block individually in response to the tonality signal.

DESCRIPTION OF THE PREFERRED EMBODIMENT

Figure 1:
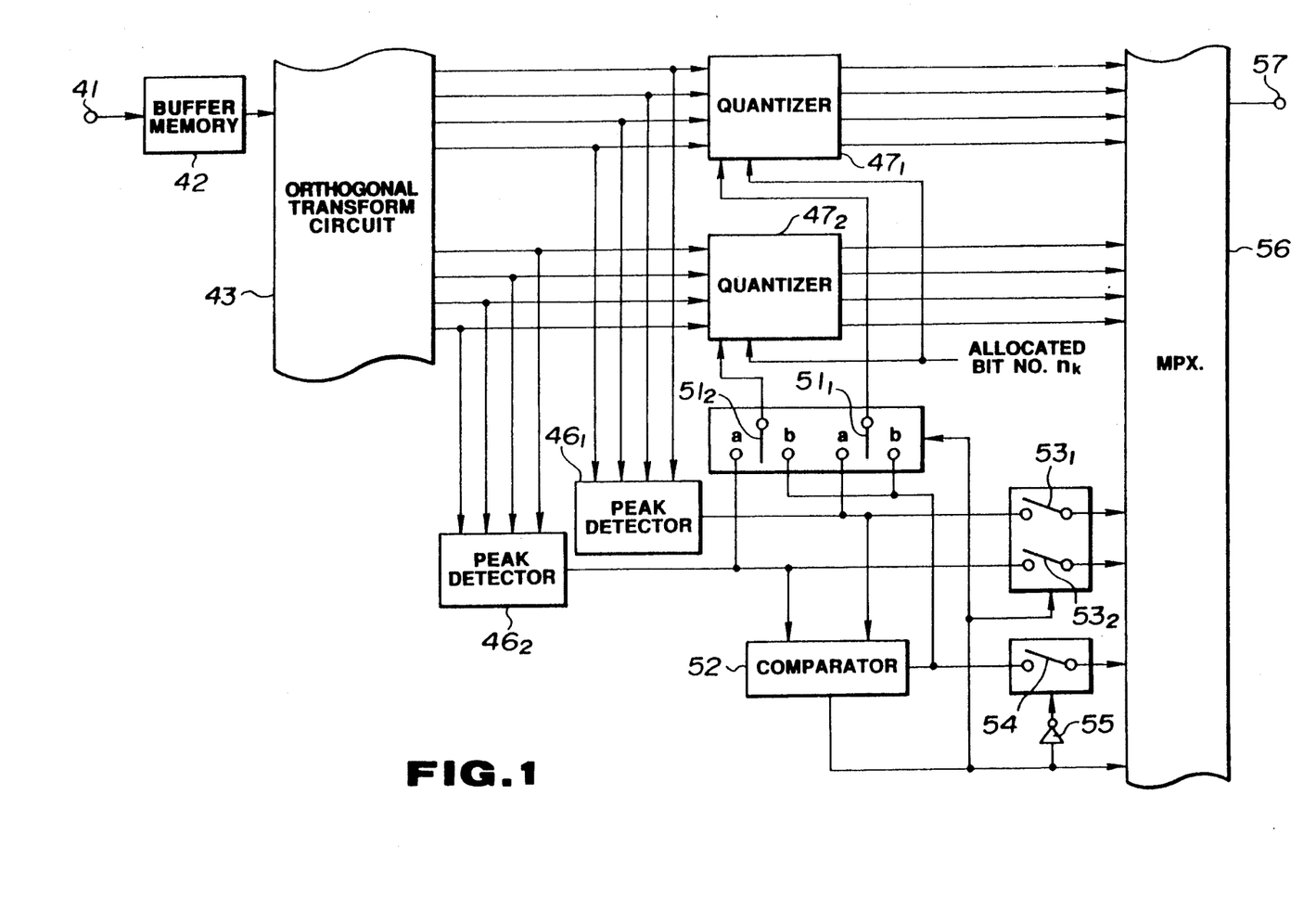
FIG. 1 is a block diagram schematically showing a portion of the configuration of an embodiment of an apparatus for compressing a digital signal according the invention.

FIG. 1 shows the configuration of part of an apparatus for compressing a digital signal which incorporates a combination of orthogonal transform processing and block floating processing.

In FIG. 1, a digital input signal, such as a PCM audio signal, is delivered to the terminal 41. The digital input signal is temporarily stored into the buffer memory 42, whence it is sent to the orthogonal transform circuit 43, where it undergoes orthogonal transform (FFT) processing. FIG. 1 shows the part of the circuit for quantizing the block of, e.g., eight spectral components of the k-th critical band. The block of eight spectral components of the k-th critical band is divided into two sub blocks of four spectral components each.

Figure 2:
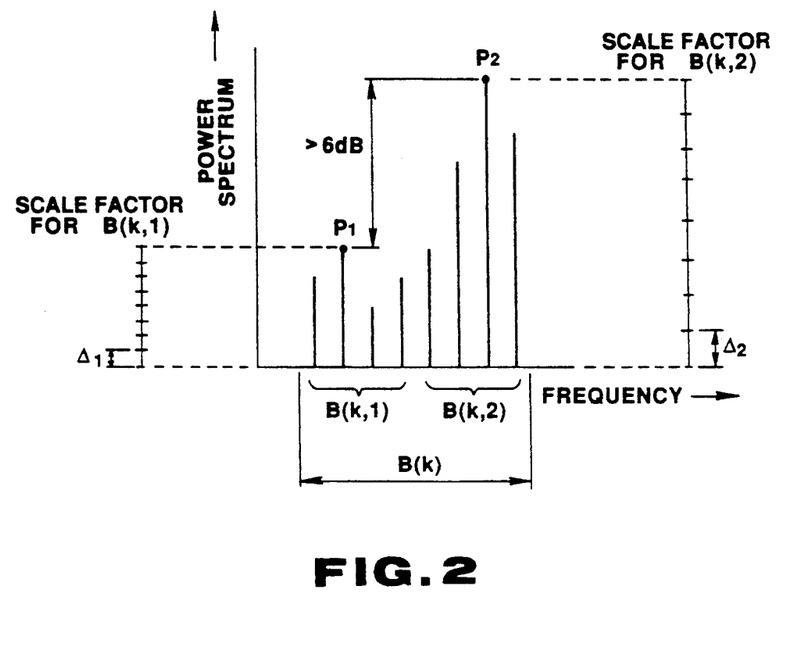
FIG. 2 is a frequency spectrum diagram for explaining the operation of the invention.

FIG. 2 shows the block B(k) of eight spectral components of the k-th critical band divided into two sub blocks B(k, 1) and B(k, 2). The four spectral components in one sub block B(k, 1) are sent to the peak detector $46_1$ and the quantizer $47_2$. The four spectral components in the other sub block B(k, 2) are sent to the peak detector $46_2$ and the quantizer $47_2$. The peak detectors $46_1$ and $46_2$ determine the peak values (i.e., maximum absolute values) $P_1$ and $P_2$ of the sub blocks B(k, 1) and B(k, 2), respectively, and provide these peak values for use as respective scale factors. The peak value from the peak detector $46_1$ is sent to the terminal a of the changeover switch $51_1$, to the comparator 52, and to the multiplexer 56 via the switch $53_1$. The peak value from the peak detector $46_2$ is sent to the terminal a of the changeover switch $51_2$, to the comparator 52, and to the multiplexer 56 via the switch $53_2$.

The comparator 52 provides two outputs: one is the greater of the two peak values provided by the respective peak detectors $46_1$ and $46_2$, and the other is a tonality signal that indicates whether the spectral components in the band correspond to a tonal signal. The indication of tonality depends on whether the difference between the peak values P1 and P2 of the respective sub blocks B(k, 1) and B(k, 2) exceeds a fixed amount. The greater peak value from the comparator 52 is sent to the multiplexer 56 via the switch 54. The tonality signal from the comparator 52 is sent as a control signal to each of the changeover switches $51_1$ and $51_2$ and to each of the switches $53_1$ and $53_2$, also as a control signal. The tonality signal is also sent from the comparator 52 via the inverter 55 to the switch 54 as a control signal.

The quantizer $47_1$ quantizes each of the four spectral components in the sub block B(k, 1) using the peak value from the changeover switch $51_1$ as the scale factor, and the allocated bit number $n_k$ determined by other processing. The quantizer $47_2$ quantizes each of the four spectral components in the sub block B(k, 2) using the peak value from the changeover switch $51_2$ as the scale factor, and the allocated bit number $n_k$. The spectral components quantized by the quantizers $47_1$ and $47_2$ are all sent to the multiplexer 56. The multiplexer 56 combines the quantized spectral components and the scale factor information and provides the result to the output terminal 57.

The configuration just described operates as follows in response to the tonality of the part of the input signal represented by the spectral components in the band. When, because the part of the input signal is highly tonal, or for some other reason, the difference between the peak values $P_1$ and $P_2$ of the sub blocks B(k, 1) and B(k, 2), respectively, in the block of spectral components B(k) of the k-th critical band is more than 6 dB, as shown in FIG. 2, the comparator 52 feeds the greater peak value P2 to the terminals b of the changeover switches $51_1$ and $51_2$, and to the switch 54. Also, the tonality signal from the comparator 52 sets the changeover switches $51_1$ and $51_2$ so that their common terminals are connected to the terminals a; turns the switches $53_1$ and $53_2$ ON; and turns the switch 54 OFF.

As a result, the changeover switch $51_1$ connects the peak value $P_1$ from the peak detector 46 to the quantizer $47_1$ as its scale factor. If the allocated bit number for the k-th critical band is 3, the four spectral components of the sub block B(k, 1) are quantized with the quantizing step size $\Delta_1$ as shown in FIG. 2. The step size $\Delta_1$ is determined by dividing the peak value $P_1$ by $2^3$ (=8) corresponding to allocated bit number $n_k=3$. Also, the changeover switch $51_2$ connects the peak value $P_2$ from the peak detector $46_2$ to the quantizer $47_2$ as its scale factor. The four spectral components of the sub block $B(k, 2)$ are quantized with the quantizing step size $\Delta_2$, as shown in FIG. 2. The quantized spectral components from the quantizers $47_1$ and $47_2$ and peak values $P_1$ and $P_2$ from the switches $53_1$ and $53_2$, respectively, are all sent to the multiplexer 56.

Figure 3:
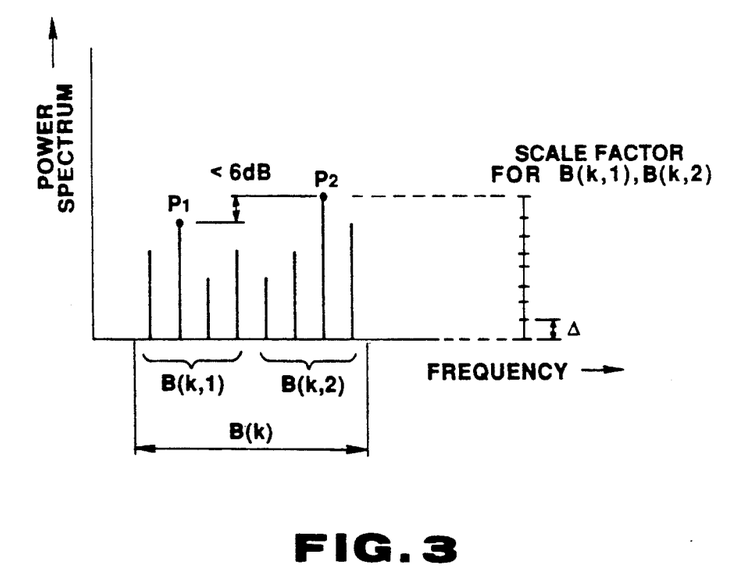
FIG. 3 is a frequency spectrum diagram for explaining another operation of the invention.

On the other hand, when the tonality of the input signal is low, or when the tonal part of the input signal falls in other critical bands, the difference between peak values $P_1$ and $P_2$ of the sub blocks $B(k, 1)$ and $B(k, 2)$, respectively, is less than 6 dB, as shown in FIG. 3, for example. In this case, the comparator 52 feeds the greater peak value $P_2$ to the terminals b of the changeover switches $51_1$ and $51_2$, and to the switch 54. Also, the tonality signal from the comparator 52 sets the changeover switches $51_1$ and $51_2$ so that their common terminals are connected to the terminal b; turns the switches $53_1$ and $53_2$ OFF; and turns the switch 54 ON.

The changeover switch $51_1$ connects the peak value $P_2$ from the comparator 52 to the respective quantizers $47_1$ and $47_2$, and the spectral components in the sub blocks $B(k, 1)$ and $B(k, 2)$ are quantized using the same quantizing step size $\Delta$, as shown in FIG. 3. Block floating is applied to the whole block $B(k)$ of eight spectral components of the k-th critical band, and the quantized spectral components are sent to the multiplexer 56. In addition, the peak value $P_2$ from the comparator 52 is sent to the multiplexer 56 via the switch 54.

When the tonality of the part of the input signal corresponding to the critical band is high and the difference between the peak values $P_1$ and $P_2$ of sub blocks $B(k, 1)$ and $B(k, 2)$, respectively, is more than 6 dB, block floating processing is individually applied to each of the sub blocks $B(k, 1)$ and $B(k, 2)$. As a result, the spectral components in the sub block $B(k, 1)$ are quantized using a optimum scale factor and step size determined independently of the peak value $P_2$ in the sub block $B(k, 2)$. On the other hand, when the tonality of the input signal is low and the difference between the peak values $P_1$ and $P_2$ is less than 6 dB, the greater peak value $P_2$ is used as the scaling factor for the whole of the original block $B(k)$. Then, applying block floating to the whole of the block $B(k)$ allows the desired result to be obtained using a single scaling factor.

Figure 4:
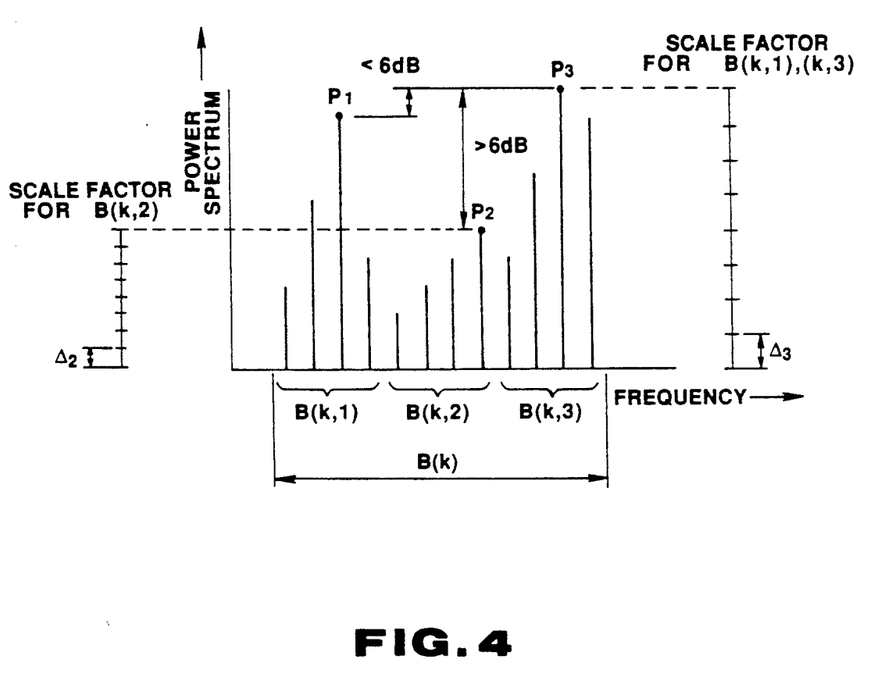
FIG. 4 is a frequency spectrum diagram for explaining the operation of another embodiment of the invention.

FIG. 4 shows an example of the block $B(k)$ corresponding to a single critical band divided into three sub blocks $B(k, 1)$, $B(k, 2)$ and $B(k, 3)$. In the example shown in FIG. 4, the peak value $P_3$ is the maximum of the peak values $P_1$, $P_2$ and $P_3$ of the sub blocks $B(k, 1)$, $B(k, 2)$ and $B(k, 3)$, respectively. In this example, the peak value $P_1$ is less than 6 dB less than the peak value $P_3$, and the peak value $P_2$ is more than 6 dB less than the peak value $P_3$.

In the example shown in FIG. 4, the spectral components in the sub blocks $B(k, 1)$ and $B(k, 3)$, where the difference between the peak values $P1$ and $P3$ is less than 6 dB, are quantized with the step size $\Delta_3$ using the maximum peak value $P_3$ as a common scale factor. On the other hand, the spectral components in the sub block $B(k, 2)$ are quantized with the step size $\Delta_2$ using the peak value $P_2$ as the scale factor. The sub blocks $B(k, 1)$ and $B(k, 3)$ are combined into a single block and block floating processing is applied to the combined block. Also, block floating processing applied to the sub block $B(k, 2)$ on its own.

When the block of spectral coefficients in a single critical band is divided into three or more sub blocks, the maximum of the peak values of the sub blocks is determined. Then, sub blocks having a peal level within 6 dB of the maximum are combined into a common block to which block floating processing is applied. This reduces the number of scaling factors that have to be included in the multiplexed output signal. Block floating processing is independently applied to sub blocks having a peak level more than 6 dB below the maximum to prevent an increase in quantizing noise in these sub blocks.

An embodiment of this invention will be now be described in connection with an apparatus for compressing a digital signal in which the technologies of the sub band coding (SBC), adaptive transform coding (ATC), and the adaptive bit allocation (APC-AB) are employed.

Figure 5:
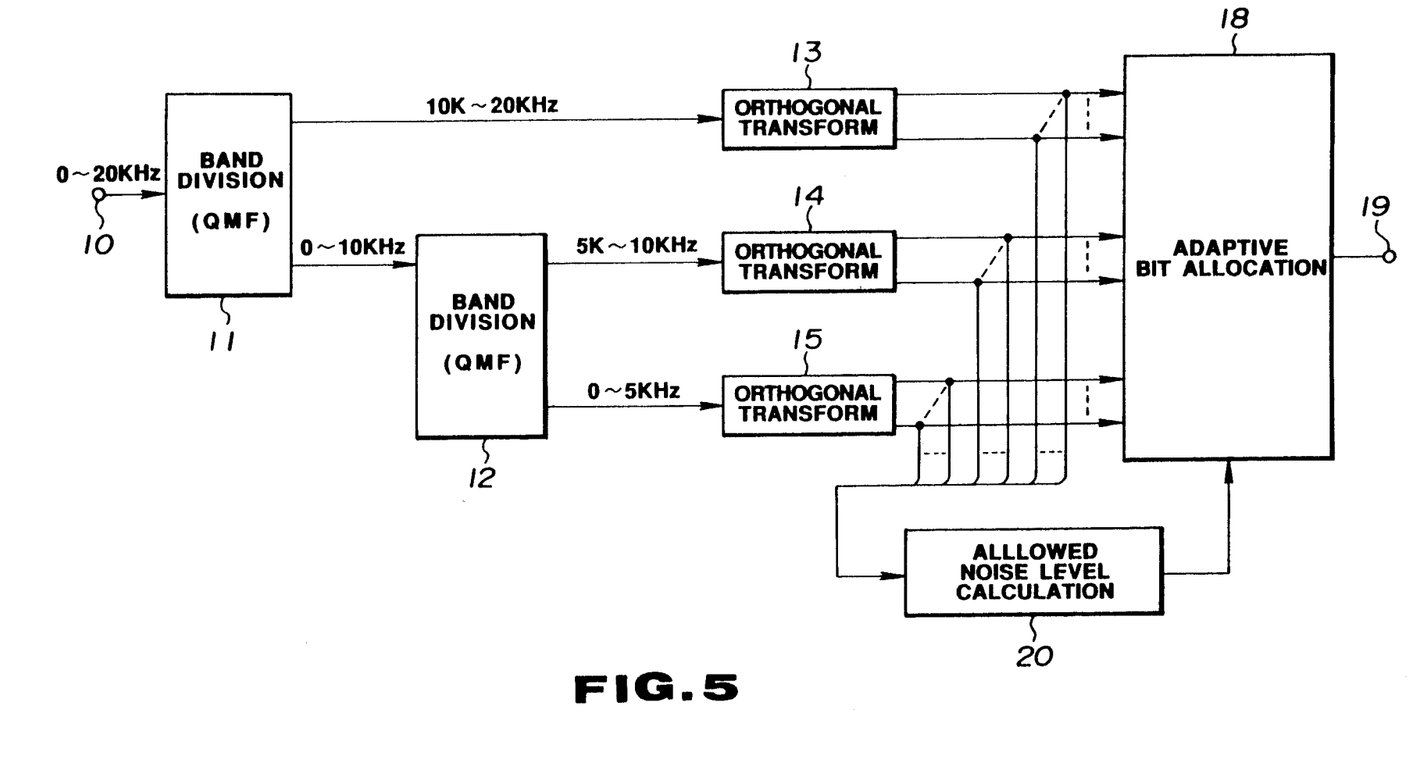
FIG. 5 is a block diagram schematically showing a practical example of an apparatus for compressing a digital signal to which the invention can be applied.

In the apparatus shown in FIG. 5, the digital input signal is divided into signal components in plural frequency ranges that have bandwidths that increase with increasing frequency of the frequency range. Orthogonal transform processing to the signal components in each frequency range. Quantizing bits are adaptively allocated to quantize the resulting spectral components in the frequency domain in each critical band. In this embodiment of the invention, the block length in the time domain is adaptively varied in response to a signal in the time domain, prior to the orthogonal transform processing. Block floating processing is applied to each time domain block.

In FIG. 5, a PCM audio signal having a bandwidth of 0 Hz to 20 kHz is delivered to the input terminal 10. The input signal is divided into signal components in the frequency range of 0 Hz to 10 kHz and the frequency range of 10 to 20 kHz by the band division filter 11, which is preferably a so-called Quadrature Mirror (QMF) filter. The signal component in the frequency range of 0 Hz to 10 kHz is divided into signal components in the frequency range of 0 Hz to 5 kHz and the frequency range of 5 to 10 kHz by the band division filter 12, which is also preferably a QMF filter. The signal component in the frequency range of 10 to 20 kHz from the band division filter 11 is sent to the orthogonal transform circuit 13; the signal component in the frequency range of 5 to 10 kHz from the band division filter 12 is sent to the orthogonal transform circuit 14; and the signal component in the frequency range of 0 to 5 kHz is sent to the orthogonal transform circuit 15. The orthogonal transform circuits 13, 14, and 15 are preferably FFT circuits and apply orthogonal transform processing to the three signal components.

Figure 6:
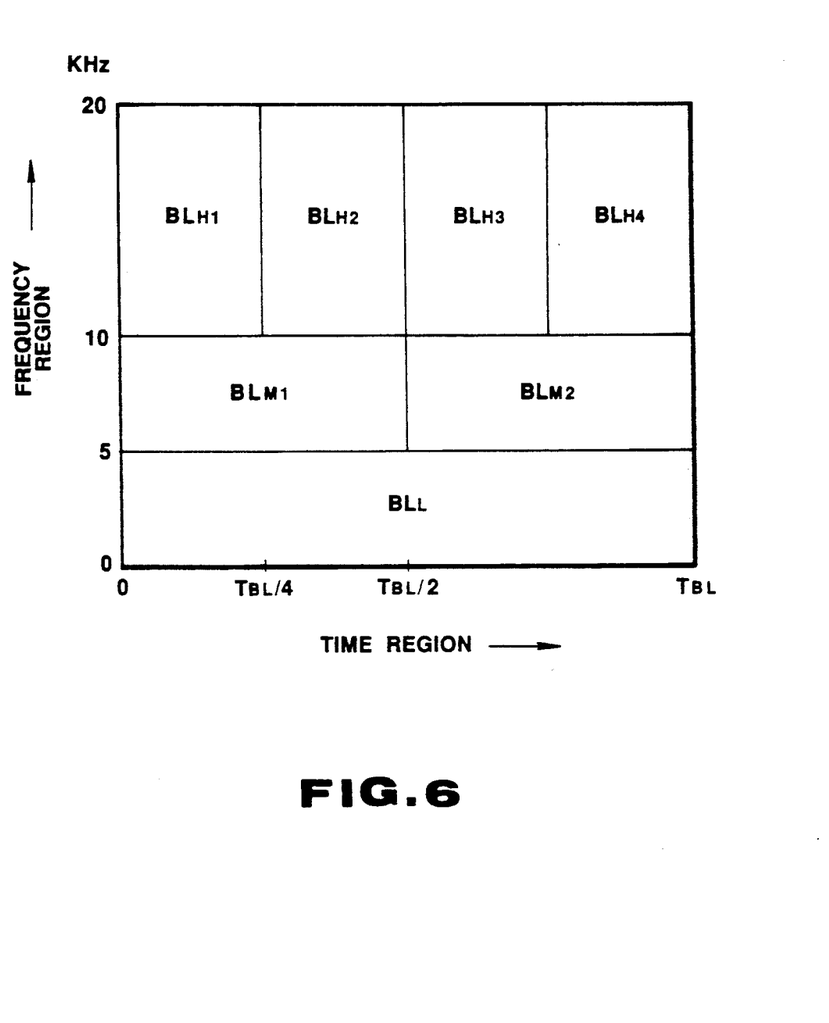
FIG. 6 shows a practical example of how the digital input signal is divided into signal components in frequency ranges and how the signal component in each frequency range is divided into blocks in the time domain in the apparatus shown in FIG. 5.

FIG. 6 shows a practical example of how an input signal having a bandwidth of 0 Hz to 20 kHz is divided into signal components in frequency ranges and the signal component in each frequency range is divided into blocks, which are delivered to the respective orthogonal transform circuits 13, 14 and 15. In the practical example shown in FIG. 6, as the frequency of the frequency range increases, the bandwidth of the frequency range is broader, and the time resolution is higher, i.e., the block length is reduced. For example, if the signal component in the low frequency range of 0 Hz to 5 kHz is divided into a block $BL_1$ consisting of, e.g., 1024 samples; the signal component in the medium frequency range of 5 to 10 kHz is divided into two blocks, $BL_{M1}$ and $BL_{H4}$, each having a block length $T_{BL/2}$. This is one half of the block length of the block $BL_L$. The signal component in the high frequency range of 10 to 20 kHz is divided into four blocks, $BL_{H1}$, $BL_{H2}$, $BL_{H3}$ and $BL_{H4}$, each having a block length $T_{BL}/4$. This is one fourth of the block length of the block $BL_L$.

When the input signal has a bandwidth of 0 Hz to 22 kHz, the low frequency range extends from 0 Hz to 5.5 kHz, the medium frequency range extends from 5.5 to 11 kHz, and the high frequency range extends from 11 to 22 kHz.

Returning to FIG. 5, the spectral components in the frequency domain, i.e., the orthogonal transform coefficient data provided as the result of the orthogonal transform processing carried out in the orthogonal transform circuits 13, 14 and 15 are combined into blocks corresponding to critical bands, and are then sent to the adaptive bit allocation circuit 18.

A critical band is a frequency band that takes account of the frequency resolution characteristic of the human sense of hearing. A critical band is a narrow band of noise that is masked by a pure sound having the same intensity as that of the noise and a frequency in the middle if the band of noise. Critical bands are such that their bandwidth increases with increasing frequency. The entire audio frequency range of 0 Hz to 20 kHz is normally divided into 25 critical bands.

The allowed noise level calculating circuit 20 calculates an allowed noise level for each critical band on the basis of the spectral components in the critical band. This takes account of masking. Then, an allocated bit number is determined for each critical band on the basis of the allowed noise level and the energy or the peak value in the critical band. The spectral components are then requantized using the bit number allocated for each critical band by the adaptive bit allocation circuit 18. The quantized spectral components are fed to the output terminal 19.

During quantizing in the adaptive bit allocation circuit 18, block floating processing is applied to the spectral components in each critical band. Also, as explained above, a block of spectral components in a single critical band may be divided into several sub blocks. Block floating processing is applied to each sub block when the part of the input signal represented by the spectral components in the critical band is tonal, i.e., when the difference between the peak values of the sub blocks is more than 6 dB. In this way, the input signal can be quantized such that quantizing noise, that heretofore has been a problem, is reduced.

Figure 7:
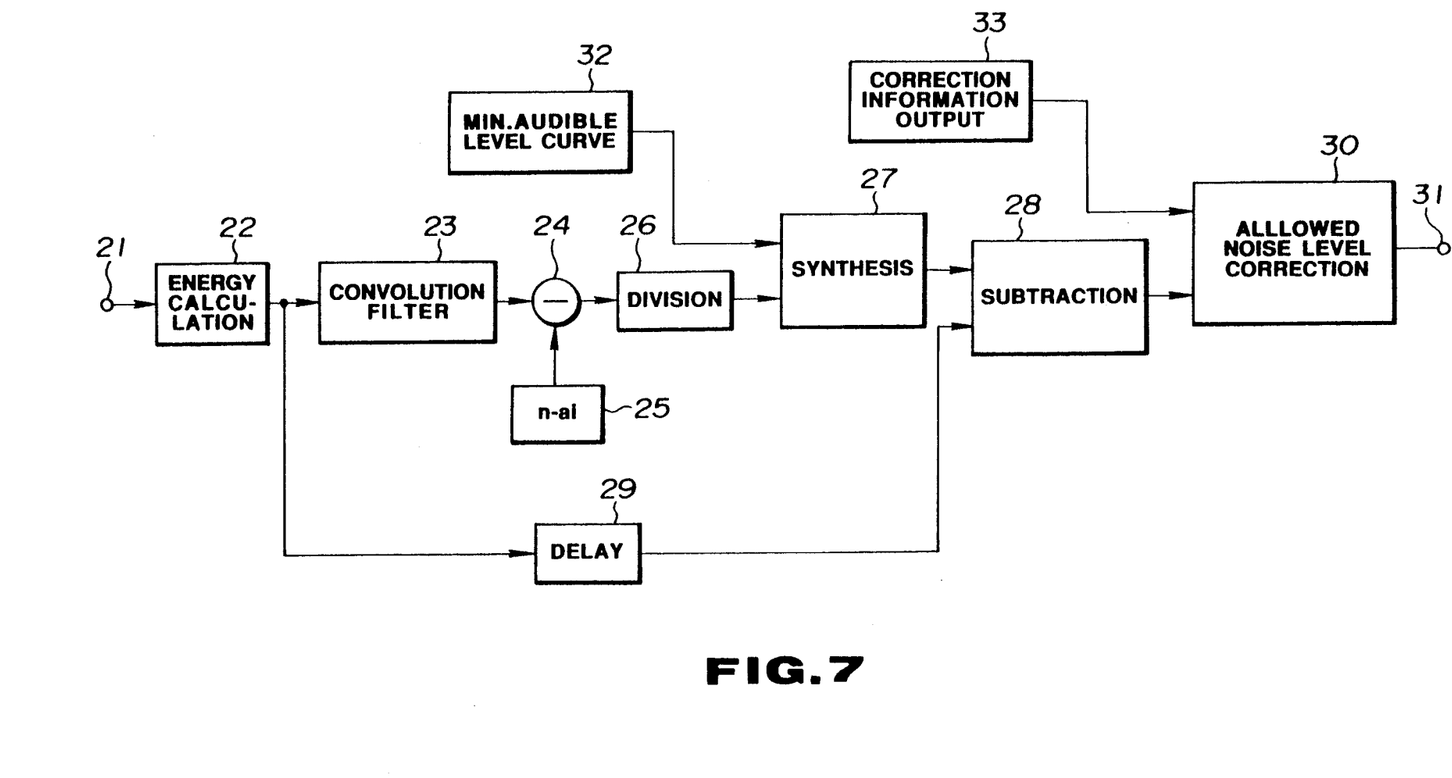
FIG. 7 is a block diagram showing an example of the allowed noise level calculating circuit 20 in the apparatus shown in FIG. 5.

FIG. 7 is a block diagram showing the configuration of a practical example of the above-mentioned allowed noise level calculating circuit 20. In FIG. 7, spectral components in the frequency domain are delivered from the respective orthogonal transform circuits 13, 14 and 15 to the input terminal 21. Each spectral component consists of only the amplitude value of the amplitude value and the phase value calculated from the real number component and the imaginary number component of orthogonal transform coefficient data produced the orthogonal transform operation. This economy can be made because the human sense of hearing is sensitive to the amplitude in the frequency domain, but is considerably less sensitive to phase.

Figure 8:
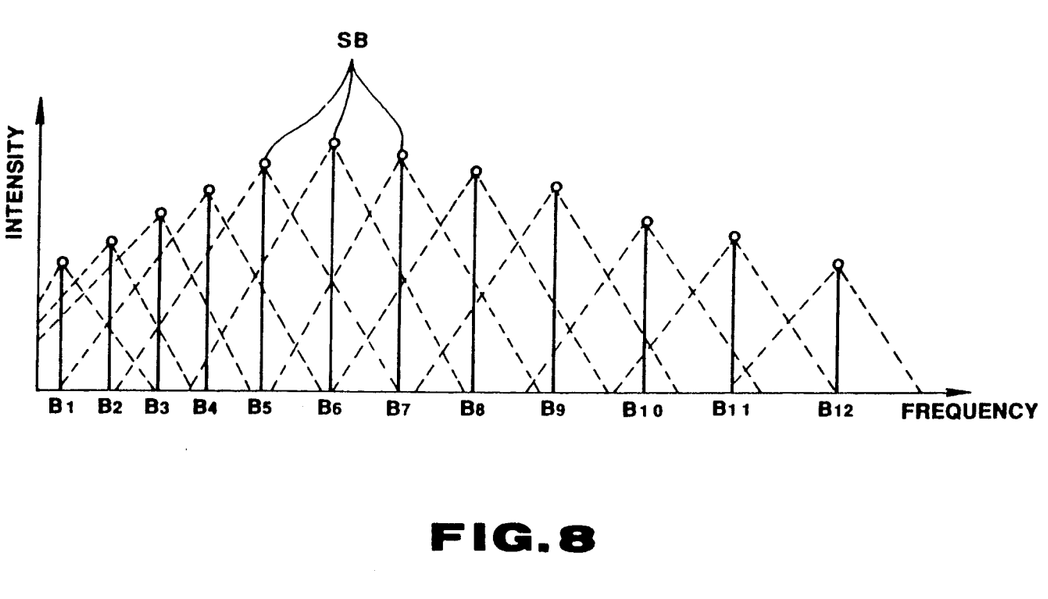
FIG. 8 shows a bark spectrum.

The spectral components are fed into the energy calculating circuit 22, which determines the energy in each critical band by, e.g., calculating the sum of the amplitude values in the band, or by some other methods. Instead of the energy in each critical band, the peak or mean amplitude values may be used. The output of the energy calculating circuit 22 is a spectrum of the energy in each critical band, and is generally called a bark spectrum. FIG. 8 shows a bark spectrum SB. Only twelve critical bands ($B_1$ to $B_{12}$) are shown to simplify the illustration.

To determine the masking effect of the bark spectrum SB, convolution processing is applied to the bark spectrum SB. The bark spectrum is multiplied by a predetermined weighting function and the resulting products are summed. To realize this, the output of the energy calculating circuit 22, i.e., the respective values of the bark spectrum SB, is sent to the convolution filter circuit 23. The convolution filter circuit 23 comprises, e.g., plural delay elements for sequentially delaying input data; plural multipliers (e.g., 25 multipliers, one for each critical band) for multiplying the outputs of each delay element by a filter coefficient or weighting function; and an adder for summing the multiplier outputs. The convolution processing determines the total of the portions indicated by the dotted lines in FIG. 8.

Masking refers to the phenomenon by which a sound is rendered inaudible to the human sense of hearing when it is masked by another sound. Masking includes temporal masking by a sound in the time domain, and simultaneous masking by a sound in the frequency domain. As a result of masking, any noise that is subject to masking temporally or simultaneously will not be heard. Consequently, in an actual audio signal, noise within the temporal or simultaneous masking range of the signal is regarded as allowable noise.

A practical example of the filter coefficients of the multipliers in the convolution filter circuit 23 will now be described. When the filter coefficient of the multiplier M corresponding to an arbitrary band is 1, at the multiplier M−1, the outputs of the respective delay elements will be multiplied by the filter coefficient 0.15; at the multiplier M−2, these outputs are multiplied by the filter coefficient 0.0019; and at the multiplier M−3, these outputs are multiplied by the filter coefficient 0.0000086. At the multiplier M+1, these outputs are multiplied by the filter coefficient 0.4; at the multiplier M+2, these outputs are multiplied by the filter coefficient 0.06; and at the multiplier M+3, these outputs are multiplied by the filter coefficient 0.007. In this way, convolution processing of the bark spectrum SB is carried out. M is an arbitrary integer of between 1 and 25.

The output of the convolution filter circuit 23 is fed into the subtractor 24. This subtractor 24 determines a level $\alpha$ in the convoluted region corresponding to the allowed noise level. This will be described below. The level $\alpha$ corresponding to the allowed noise level is the level that will become the allowed noise level in each critical band after carrying out the deconvolution processing to be described below.

An allowed function, which represents the masking level, for determining the level $\alpha$ is fed into the subtractor 24. Increasing or decreasing the allowed function controls the level $\alpha$. The allowed function is generated by the (n-ai) function generator 25, which will be described below.

When the number of a critical band is i, the number of the lowest-frequency critical band being 1, the level $\alpha$ corresponding to the allowed noise level is determined by the following equation:

$$\alpha = S - (n - ai) \tag{1}$$

where n and a are respectively constants (a>0), and S is intensity of the convolution-processed bark spectrum. In equation (1), (n-ai) represents the allowed function. In the preferred embodiment, n is set to 38 and a is set to 1. With these settings, there is no deration of the sound quality, and a satisfactory compressed signal is therefore generated.

In this way, the level $\alpha$ is determined, and is transmitted to the divider 26. The divider 26 applies deconvolution to the level $\alpha$ in the convoluted region. Carrying out deconvolution determines the masking spectrum from the level $\alpha$. The masking spectrum becomes the allowed noise spectrum. While deconvolution normally requires complicated processing, deconvolution is carried out in the preferred embodiment by the simple divider 26.

Figure 9:
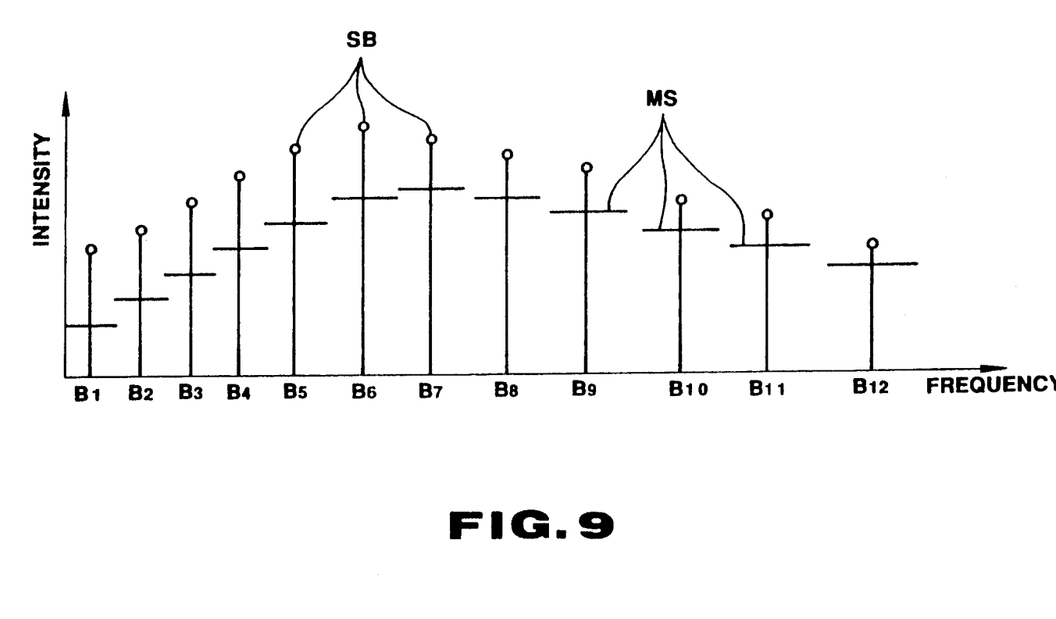
FIG. 9 shows a masking spectrum.

The masking spectrum is transmitted to the subtractor 28 via the synthesis circuit 27. The synthesis circuit also receives the output of the energy calculating circuit 22, i.e. the bark spectrum SB, via the delay circuit 29. The subtractor 28 performs a subtraction operation between the masking spectrum and the bark spectrum SB. FIG. 9 shows how the portion of the bark spectrum SB below the level of the masking spectrum MS is masked.

The output of the subtractor 28 is fed via the allowed noise level corrector 30 and the output terminal 31 to a ROM, etc. (not shown) in which plural allocated bit number information is stored. This ROM, etc. provides allocated bit number information for each critical band in response to the output of the subtractor 28 corrected by the allowed noise level corrector 30. This corresponds to a corrected level difference between the energy in each band and the output of the allowed noise level calculating circuit. The allocated bit number information is sent to the adaptive bit allocation circuit 18, which quantizes the spectral components from the orthogonal transform circuits 13, 14 and 15 using, for the spectral components in each band, the allocated bit number for the critical band.

The adaptive bit allocation circuit 18 quantizes the spectral components in each critical band using bit numbers allocated depending upon the difference between the energy in each critical band (or in each sub band thereof) of the critical band and the output of the allowed noise level calculating circuit. The delay circuit 29 is provided to delay the bark spectrum SB from the energy calculating circuit 22 to take account of delay in circuits preceding to the synthesis circuit 27.

Figure 10:
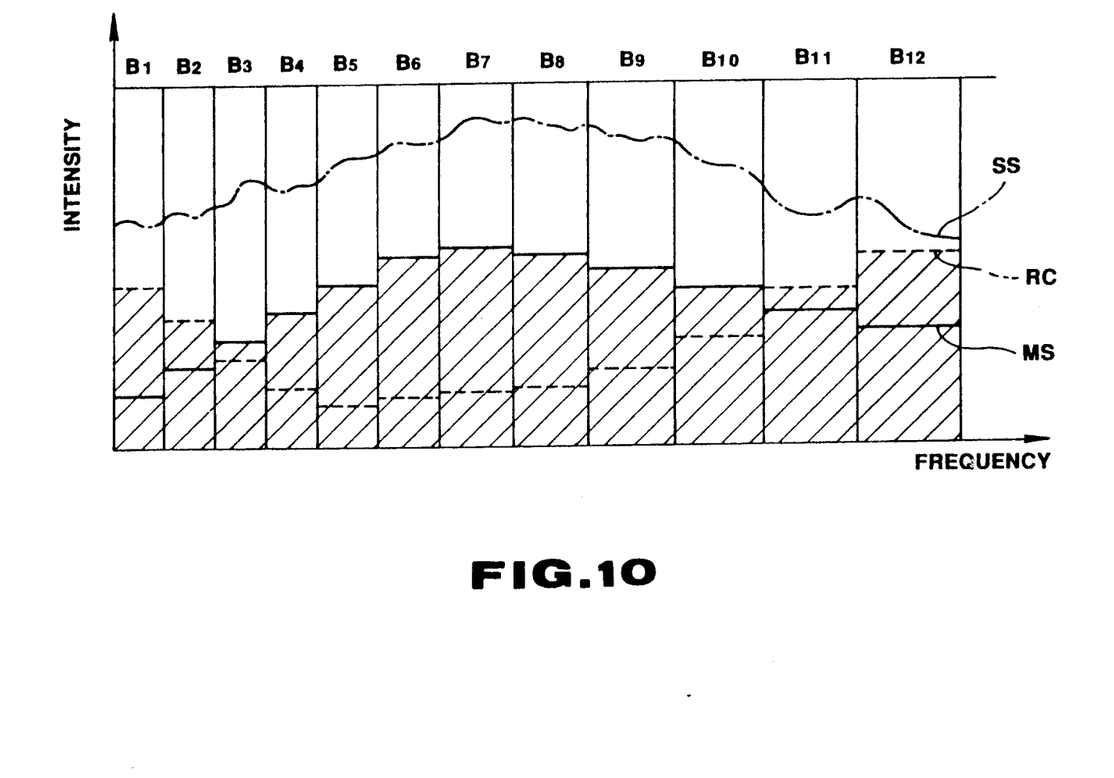
FIG. 10 shows the minimum audible level curve synthesized with the masking spectrum.

The synthesis circuit 27 synthesizes data indicating the so-called minimum audible level curve RC, and the masking spectrum MS, as shown in FIG. 10. The minimum audible level curve is another characteristic of the human sense of hearing, and is generated by the minimum audible level curve generator 32. Noise having an absolute level below the minimum audible level curve cannot be heard. For a given quantization, the minimum audible level curve varies depending on, e.g., the loudness level when the signal is reproduced. However, since the manner in which music fits within the dynamic range of practical 16-bit digital systems, if quantizing noise is inaudible in the frequency band to which the ear is most sensitive, i.e., the frequency band in the vicinity of 4 kHz, it can be assumed that quantizing noise less than the level of the minimum audible level curve will not heard in other frequency bands. Accordingly, when the quantizing noise level in the vicinity of 4 kHz corresponding to the word length set by the system is not heard, the allowed noise level can be provided by synthesizing the minimum audible level curve RC and the masking spectrum MS. The resulting allowed noise level in each critical band may be up to the level indicated by the cross-hatched portion in FIG. 10. In this embodiment, the level of the minimum audible level curve at 4 Khz is set to correspond to the minimum level corresponding to quantizing using, e.g., 20 bits. FIG. 10 also shows the signal spectrum SS.

The allowed noise level corrector 30 corrects the allowed noise level at the output of the subtractor 28 in response to information defining the so-called equi-loudness curve, sent from the correction information output circuit 33. The equi-loudness curve is yet another characteristic of the human sense of hearing. This curve is derived by determining the sound pressure levels at various frequencies that can be heard at the same intensity as that of a pure sound at 1 kHz. The equi-loudness curve is substantially similar to the minimum audible curve RC shown in FIG. 10. In the equi-loudness curve, a sound in the vicinity of 4 kHz is heard with the same intensity as that of a sound at 1 kHz, even if the sound pressure level is 8 to 10 dB less than that of the 1 kHz sound. On the other hand, a sound in the vicinity of 50 Hz must have a sound pressure level of about 15 dB greater than the sound pressure level of a 1 kHz sound to be heard at the same intensity. For this reason, the allowed noise level above the level of the minimum audible level curve should have a frequency characteristic given by a curve corresponding to the equi-loudness curve. It can be seen that adapting to the characteristic of the human sense of hearing requires correcting the allowed noise level by taking the equi-loudness curve into consideration.

In this embodiment, the correction information output circuit 33 employs a circuit to correct the allowed noise level in response to the measured data quantity at the output of the adaptive bit allocation circuit 18 and the target bit rate of the compressed output signal. The reason why such a correction is made is as follows: there are instances where a preliminary temporary adaptive bit allocation to all blocks to which bits are to be allocated may be in error with respect to the target number of bits determined by the bit rate of the final compressed output signal. In such instances, it is necessary to repeat the bit allocation to reduce the error to zero. When the total number of bits allocated is less than the target value, bit number differences are allocated to the blocks to increase the number of bits allocated. In contrast, when the total number of allocated bits is greater than the target value, bit number differences are allocated to the blocks to decrease the number of bits allocated.

To achieve this, the correction information output circuit 33 provides correction data to correct the allocated bit numbers in response to measured data indicating the error between the target value and the total number of allocated bits. When the error indicates that the number of bits is insufficient, an increased number of bits per block is used, so that consideration can be made of when the total number of allocated bits is greater than the target value. When the error indicates that the number of bits is excessive, it is sufficient that the number of bits per unit block is small, so that consideration can be made of when the total number of allocated bits is less than the target value. Accordingly, correction value data for correcting the allowed noise level at the output of the subtractor 28 in response to, e.g., the equi-loudness curve, is fed from the correction information output circuit 33 in accordance with the error. The correction data is transmitted to the allowed noise corrector 30, so that the allowed noise level from the subtractor 28 can be corrected.

This invention is not limited to the above-described embodiment. This invention is applicable not only to a signal processor for compressing a PCM audio signal, but also to a signal processor for compressing a digital speech signal or a digital video signal, etc. Also, the above-described synthesis processing of the minimum audible curve may be omitted. In this case, the minimum audible curve generator 32 and the synthesis circuit 27 are unnecessary, and the output from the subtractor 24 is subjected to deconvolution by the divider 26, and is then transmitted directly to the subtractor 28.

I claim:

1. An apparatus for compressing a digital input signal, the apparatus comprising:
- a deriving mans for deriving from the digital input signal plural spectral components in the frequency domain, the spectral components being divided into blocks corresponding to critical bands;
- means for dividing one of the blocks of spectral components corresponding to critical bands in frequency into sub blocks;
- peak value determining means for determining a peak value for each sub block;
- comparing means for determining a difference in the peak values of the sub blocks; and
- block floating means for applying block floating processing to the sub blocks individually when the difference from the comparing means is above a fixed value.

2. The apparatus of claim 1, wherein, when the difference from the comparing means is within the fixed value, the block processing means applies block floating processing to the sub blocks using a common scale factor.

3. The apparatus of claim 1, wherein
- the peak value determining means determines the peak value for each sub block by determining a maximum absolute value of all th spectral components in the sub block; and
- the block floating means applies block floating to the spectral components in each sub block using the peak value determined by the peak value determining mans as a scale factor common to all the spectral components in the sub block.

4. The apparatus of claim 3, wherein the fixed value is 6 dB.

5. The apparatus of claim 3, wherein the block floating means includes a requantizing means for requantizing the spectral components in the sub blocks individually when the difference from the comparing means is above the fixed value.

6. The apparatus of claim 1, wherein the deriving means includes:
- a means for dividing the input signal into a signal component in each of plural frequency ranges;
- a means for dividing in time the signal in each frequency range into blocks;
- an orthogonal transform means for orthogonally transforming each block of each frequency range signal to provide the spectral components in the frequency domain; and
- a means for dividing the spectral components in the frequency domain into blocks corresponding to critical bands.

7. The apparatus of claim 6 wherein the orthogonal transform means applies a faster Fourier transform (FFT).

8. The coding apparatus of claim 6 wherein the orthogonal transform means applies a discrete cosine transform (DCT).

9. An apparatus for compressing a digital input signal, the apparatus comprising:
- a deriving mans for deriving plural spectral components from the digital input signal, the plural spectral components being divided into blocks, each block corresponding to a critical band;
- block dividing means for dividing one of the blocks of spectral components into two sub blocks;
- tonality signal generating means for generating a tonality signal indicating when part of the input signal represented by the spectral components in the block is tonal; and
- a block floating means for applying block floating processing to both sub blocks using a common scale factor, the block floating means applying block floating to each sub block individually in response to the tonality signal.

10. The apparatus of claim 9, wherein the tonality signal generating means includes:
- a means for determining a peak value for each sub block; and
- a means for determining a difference between the peak values of the sub blocks, and for generating the tonality signal when the difference is greater than a predetermined value.

11. The apparatus of claim 10, wherein:
- the block floating means includes a means for selecting the greater of the peak values of the sub blocks as the common scale factor; and
- the block floating means applies block floating processing to each sub block individually using the peak value for each sub block as a scale factor for the sub block in response to the tonality signal.

12. The apparatus of claim 9, additionally comprising a requantizing means for requantizing the spectral components in both sub blocks using a common step size, the requantizing means requantizing the spectral components in each sub block using a different step size in response to the tonality signal.

13. The apparatus of claim 12, wherein:
- the apparatus additionally comprises a means for determining an allocated bit number for each critical band; and
- the requantizing means includes a step size determining means for determining the common step size by dividing the common scale factor by a number of steps corresponding to the allocated bit number, the step size determining a step size for each sub block by dividing the scale factor for each sub block by the number of steps corresponding to the allocated bit number in response to the tonality signal.

14. The apparatus of claim 13, wherein:
- the block floating means includes a means for selecting the greater of the peak values of the sub blocks as the common scale factor; and
- the block floating means applies block floating processing to each sub block individually using the peak value for each sub block as a scale factor for the sub block in response to the tonality signal.

15. The apparatus of claim 9, wherein the deriving means includes:
   a means for dividing the input signal into a signal component in each of plural frequency ranges;
   a means for dividing in time the signal in each frequency range into blocks;
   an orthogonal transform means for orthogonally transforming each block of each frequency range signal to provide the spectral components in the frequency domain; and
   a means for dividing the spectral components in the frequency domain into blocks corresponding to critical bands.

* * * * *

UNITED STATES PATENT AND TRADEMARK OFFICE
CERTIFICATE OF CORRECTION

PATENT NO.: 5,264,846
DATED: November 23, 1993
INVENTOR(S): YOSHIAKI OIKAWA

It is certified that an error appears in the above-identified patent and that said Letters Patent is hereby corrected as shown below:

On the title page, left column, please insert:

--[73] Assignee: Sony Corporation. Tokyo, Japan.--.

Signed and Sealed this

Sixth Day of October, 1998

Attest:

BRUCE LEHMAN

Attesting Officer

Commissioner of Patents and Trademarks